US010929218B2

(12) United States Patent
Xu et al.

(10) Patent No.: US 10,929,218 B2
(45) Date of Patent: Feb. 23, 2021

(54) JOINT SEMANTIC AND FORMAT SIMILARITY FOR LARGE SCALE LOG RETRIEVAL

(71) Applicant: NEC Laboratories America, Inc., Princeton, NJ (US)

(72) Inventors: Jianwu Xu, Titusville, NJ (US); Haifeng Chen, Windsor, NJ (US)

(73) Assignee: NEC CORPORATION

( * ) Notice: Subject to any disclaimer, the term of this patent is extended or adjusted under 35 U.S.C. 154(b) by 126 days.

(21) Appl. No.: 16/400,402

(22) Filed: May 1, 2019

(65) Prior Publication Data

US 2019/0354422 A1  Nov. 21, 2019

Related U.S. Application Data

(60) Provisional application No. 62/672,569, filed on May 16, 2018.

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/0751* (2013.01); *G06F 11/0775* (2013.01); *G06F 11/0778* (2013.01); *G06F 11/3065* (2013.01)

(58) Field of Classification Search
CPC ............... G06F 11/079; G06F 11/0751; G06F 11/0775; G06F 11/0778; G06F 11/3065; G06F 11/0709; G06F 11/3476
See application file for complete search history.

(56) References Cited

U.S. PATENT DOCUMENTS

| | | | |
|---|---|---|---|
| 5,463,768 A | * | 10/1995 | Cuddihy ............ G06F 11/2205 714/37 |
| 6,671,683 B2 | | 12/2003 | Kanno |
| 7,231,388 B2 | | 6/2007 | Matsubayashi et al. |

(Continued)

OTHER PUBLICATIONS

Smeulders, "Content-Based Image Retrieval at the End of the Early Years", IEEE Transactions on Pattern Analysis and Machine Intelligence, vol. 22, Issue 12, Dec. 2000, pp. 1349-1380.

(Continued)

*Primary Examiner* — Charles Ehne
(74) *Attorney, Agent, or Firm* — Joseph Kolodka

(57) ABSTRACT

A method for diagnosing computer system faults using log retrieval based on joint semantic and syntactic similarities includes receiving a set of query logs, defining joint semantic and syntactic similarities between the set of query logs and respective ones of multiple sets of historical logs based on semantic content and syntactic information obtained for the set of query logs and the multiple sets of historical logs, the multiple sets of historical logs being associated with historical computer system fault diagnoses, retrieving a set of historical logs from the multiple sets of historical logs to obtain a retrieved set of historical logs for computer system fault comparison based on a similarity measure corresponding to each of the multiple sets of historical logs derived from the joint semantic and syntactic similarities, and transmitting the retrieved set of historical logs to one or more computing devices to perform the computer system fault comparison.

20 Claims, 11 Drawing Sheets

(56) References Cited

U.S. PATENT DOCUMENTS

| | | | |
|---|---|---|---|
| 9,104,877 B1* | 8/2015 | Allen | G06F 21/552 |
| 10,178,067 B1* | 1/2019 | Kumar | H04L 67/02 |
| 2015/0089309 A1* | 3/2015 | Fu | G06F 11/0724 |
| | | | 714/57 |
| 2017/0083390 A1* | 3/2017 | Talwadker | G06F 11/0748 |
| 2018/0060314 A1 | 3/2018 | Xu et al. | |

OTHER PUBLICATIONS

Hamooni, "LogMine: Fast Pattern Recognition for Log Analytics", Proceedings of the 25th ACM International Conference on Information and Knowledge Management, Oct. 2016, pp. 1573-1582.

Ning, "HLAer: a System for Heterogeneous Log Analysis", SDM Workshop on Heterogeneous Learning, Apr. 2014, 22 pages.

Zytrax, http://www.zytrax.com/tech/web/regex.html, Jul. 2018, 32 pages.

Smith, "Identification of Common Molecular Subsequences," Journal of Molecular Biology, vol. 147, No. 1, Mar. 1981, pp. 195-197.

Sokal, "A Statistical Method for Evaluating Systematic Relationships", University of Kansas Science Bulletin, vol. 38, Mar. 1958 pp. 1409-1438.

Logstash, https://www.elastic.co/products/logstash, Mar. 2019, 16 pages.

Elasticstach, https://www.elastic.co/products/logstash, Mar. 2019, 17 pages.

* cited by examiner

200

210

```
2018/04/15 10:12:23 2341 Information: job ID 10203293 submitted
status=10h
2018/04/15 12:34:03 382234 Error: job ID 39482084 failure status=20h
```

220

```
%{timestamp} %{Base16Number:P1F1} Information: job
ID %{Base16Number:P1F2} status = %{NotWhiteSpace:P1F3}
%{timestamp} %{Base16Number:P2F1} Error: job ID %{Base16Number:P2F2}
failure status = %{NotWhiteSpace:P2F3}
```

FIG. 2

JOINT SEMANTIC AND FORMAT SIMILARITY FOR LARGE SCALE LOG RETRIEVAL

RELATED APPLICATION INFORMATION

This application claims priority to provisional application Ser. No. 62/672,569, filed on May 16, 2018, incorporated by reference herein its entirety.

BACKGROUND

Technical Field

The present invention relates to computer system maintenance and monitoring, and more particularly to log retrieval and fault diagnosis.

Description of the Related Art

In computer system maintenance and monitoring management technology, computer software logs can be generated and used to perform computer system fault diagnosis and recovery. More specifically, system administrators can diagnose computer system failures by comparing a current failure event with a set of similar failure incidents that have previously occurred. After obtaining a set of similar failure incidents from historical logs, system administrators can study and search for potential root causes of computer system failure based on previous diagnosis results. However, if retrieval precision is low, many false positives can be presented to system administrators introducing confusion. On the other hand, if retrieval recall is low, many true positives can be missed, and thus can detract from computer system fault diagnosis.

SUMMARY

According to an aspect of the present invention, a method for diagnosing computer system faults using log retrieval based on joint semantic and syntactic similarities is provided. The method includes receiving a set of query logs, defining joint semantic and syntactic similarities between the set of query logs and respective ones of multiple sets of historical logs based on semantic content and syntactic information obtained for the set of query logs and the multiple sets of historical logs. The multiple sets of historical logs are associated with historical computer system fault diagnoses. The method further includes retrieving a set of historical logs from the multiple sets of historical logs to obtain a retrieved set of historical logs for computer system fault comparison based on a similarity measure corresponding to each of the multiple sets of historical logs derived from the joint semantic and syntactic similarities, and transmitting the retrieved set of historical logs to one or more computing devices to perform the computer system fault comparison.

In accordance with another embodiment of the present invention, a system for diagnosing computer system faults using log retrieval based on joint semantic and syntactic similarities is provided. The system includes a memory device for storing program code and at least one processor operatively coupled to the memory device. The at least one processor is configured to execute program code stored on the memory device to receive a set of query logs, define joint semantic and syntactic similarities between the set of query logs and respective ones of multiple sets of historical logs based on semantic content and syntactic information obtained for the set of query logs and the multiple sets of historical logs. The multiple sets of historical logs are associated with historical computer system fault diagnoses. The at least one processor device is further configured to execute program code stored on the memory device to retrieve a set of historical logs from the multiple sets of historical logs to obtain a retrieved set of historical logs for computer system fault comparison based on a similarity measure corresponding to each of the multiple sets of historical logs derived from the joint semantic and syntactic similarities, and transmit the retrieved set of historical logs to one or more computing devices to perform the computer system fault comparison These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a diagram illustrating an example of original logs and corresponding log formats, in accordance with an embodiment of the present invention;

DETAILED DESCRIPTION OF PREFERRED EMBODIMENTS

To improve log retrieval processes, the embodiments described herein provide for systems and methods for log retrieval based on joint semantic and syntactic similarities. More specifically, the embodiments described herein can, in response to receiving a set of query logs, define joint semantic and syntactic similarities between the set of query logs and respective ones of multiple sets of historical logs based on semantic content and syntactic information obtained from the multiple sets of historical logs. A set of historical logs from the multiple sets of historical logs can be retrieved based on a similarity measure corresponding to each of the multiple sets of historical logs derived from the joint semantic and syntactic similarities. For example, the multiple sets of historical logs can be automatically ranked based on the similarity measures, and a most similar one of the multiple sets of historical logs to the set of query logs can be selected for retrieval. The retrieved set of historical logs can be transmitted to one or more computing devices, which can be associated with one or more system administrators, for comparison against the set of query logs with the extracted statistics for understanding and summarization to help diagnose system faults.

In contrast to both text document and content-based image retrieval methodologies that utilize feature vector representations of text documents and content-based images, respectively, the embodiments described herein can implement log retrieval using both semantic content and syntactic information. One reason for using both semantic content and syntactic information for performing log retrieval is that logs can be produced from an executing software application that prints out system status statement with both text and numerical information. For example, it may be possible that two log messages can share the same set of distinct text keywords while conveying different structural meanings because of different syntax. However, system administrators may not be interested in analyzing only a single log during fault diagnosis because the relationship and order of multiple logs can provide more information. Accordingly, the embodiments described herein can provide for a flexible design with the capability of adopting new features, if necessary, and can provide an adaptive learning approach to handle large scale log data.

Figure 1:
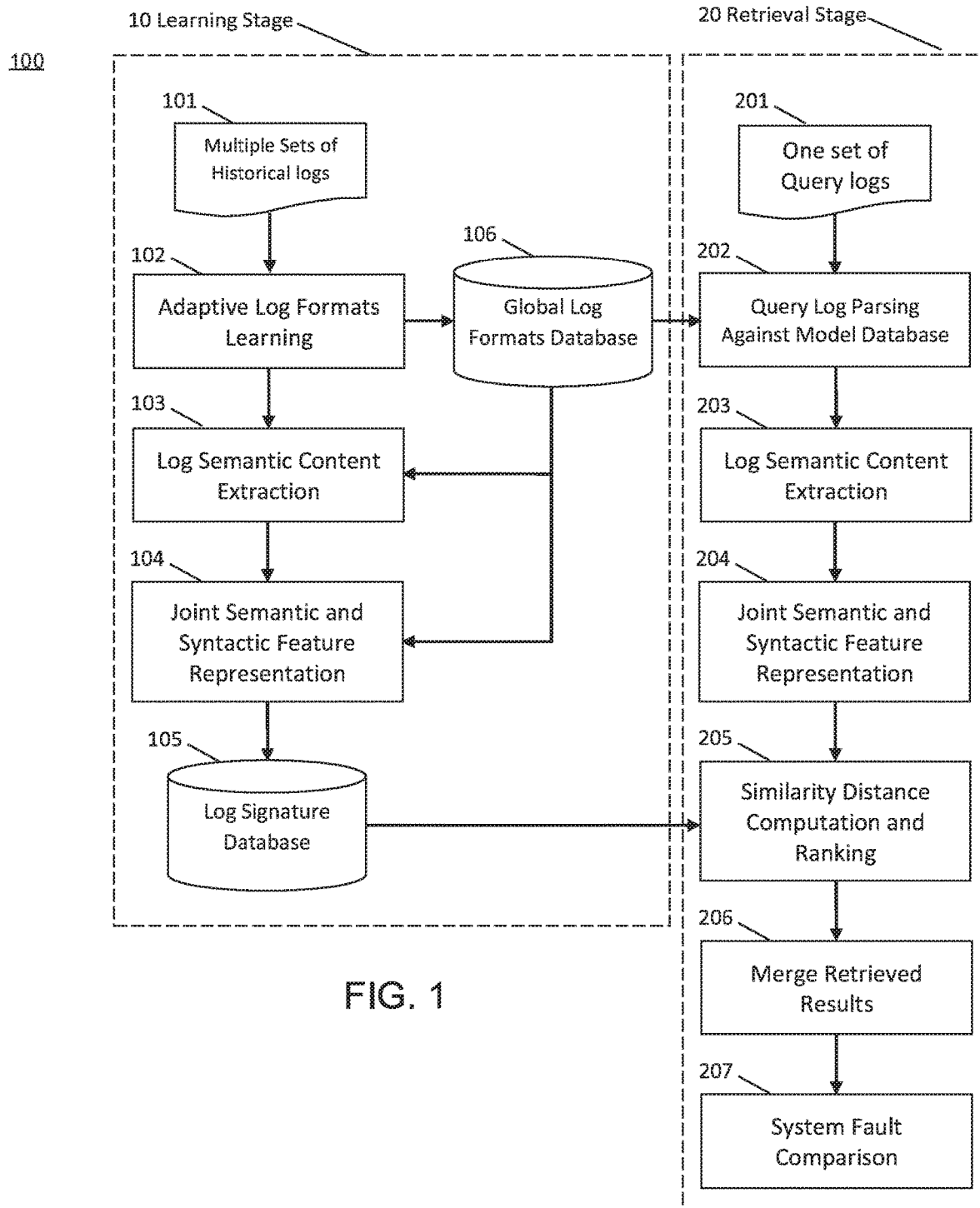
FIG. 1 is a block/flow diagram of an overview of an architecture for log retrieval based on joint semantic and format similarity, in accordance with an embodiment of the present invention.

Referring now in detail to the figures in which like numerals represent the same or similar elements and initially to FIG. 1, a block/flow diagram is provided illustrating a high-level overview of an architecture 100 for log retrieval based on joint semantic and format similarity. As shown, architecture 100 can include a learning stage 10 and a retrieval stage 20.

Learning stage 10 can include a plurality of components that can index and organize sets of historical logs to form feature vectors. As will be described in further detail, both semantic content and syntactic information can be extracted from each set of historical logs, and feature vectors representing each set of historical logs can be computed based on the extracted semantic content and syntactic information.

As used herein, semantic content refers to the specific content within different fields of a log message. Semantic content can include information relating to, for example, the meaning of each log message, the value of certain fields, etc.

As used herein, syntactic information refers to the template or format of the log message. For example, the format of the log message can be in terms of regular expression ("regex"). The regular expression is the generating skeleton, which is a condensed representation of multiple log messages. For example, in the following example set of logs:

2017/01/01 00:00:10.000 Pattern A 00x000001
2017/01/01 00:00:10.000 Pattern A 00x000002
2017/01/01 00:00:10.000 Pattern A 00x000001
2017/01/01 00:00:10.000 Pattern A 00x000001
2017/01/01 00:00:11.000 Pattern B 00x000000
2017/01/01 00:00:11.000 Pattern B 00x000001 the following syntactic information in the form of regular expressions can be extracted:

{timestamp} Pattern A {numbers}
{timestamp} Pattern B {numbers}

As further shown, multiple sets of historical logs 101 are provided. Multiple sets of historical logs 101 can include multiples sets of heterogeneous logs obtained from one or more systems or software applications that produce logs for recording system events, status or any other information. Multiple sets of historical logs 101 can be transported into architecture 100 via a streaming process, message transporter, file transfer, or any other manner. The logs of multiple sets of historical logs 101 can include unstructured text content with one or multiple fields and, in some embodiments, can include timestamps that record when a particular event or printout occurs in the originating system or application. The multiple sets of historical logs 101 can be associated with historical system failures associated with the architecture 100.

Multiple sets of historical logs 101 can be organized into multiple sets separated by time segments, either by day, or by hour, etc. For example, a time resolution can be set by users based on certain domain knowledge of the underlying system or particular tasks. As another example, a default time resolution can be set by discovering the seasonality of historical logs if the time resolution parameter is not set by the users. Each set of multiple sets of historical logs 101 can include logs from multiple sources. For example, one segment of logs can have database logs, front end application logs, backend application logs, access logs, etc.

The multiple sets of historical logs 101 can be provided to a component 102 for adaptive log formats learning. Component 102 can automatically generate log syntactic formats directly from logs without requiring human supervision. The log format can refer to the syntactic information of log messages, which can correspond to the printout statements in software source code. A diagram 200 providing an illustrative example of original logs 210 and corresponding log formats 220 is provided with reference to FIG. 2.

As illustrated in FIG. 2, log formats 220 can include variable fields which can take different values in different log messages. These variable fields can include numbers, words, IP addresses, time stamps, symbols, mixtures of numbers and words, etc. For example, log formats 220 can include variable fields such as time stamps: % {timestamp}, numbers: % {Base 16Number:P1F1}, and mixtures of numbers and words: % {NotWhiteSpace:P2F3}. The content of the variable fields refers to the semantic information of logs and can characterize the content distribution and range.

Referring back to FIG. 1, a common log format dictionary can be needed by component 102 to perform a comparison between a set of query logs to a set of historical logs. Additionally, it is possible for certain common log formats to exist in multiple sets of historical logs. For example, a job scheduling system can record same log formats of job status with different job identifications (IDs) in consecutive days. Therefore, to aggregate all log syntactic formats without redundancy and repetition, an adaptive learning approach can be used by component 102 for global log format ID generation. For example, an adaptive log format mining method can continuously learn, modify, synchronize and aggregate a global log syntactic format dictionary with the latest historical logs. A new set of log formats is not reproduced from scratch every time a new set of historical logs is available. Rather, the new set of text logs can be parsed with the previous learned log format dictionary (e.g., based on regular expression matching). Further details regarding the operation of component 102 will now be described with reference to FIG. 3.

Figure 3:
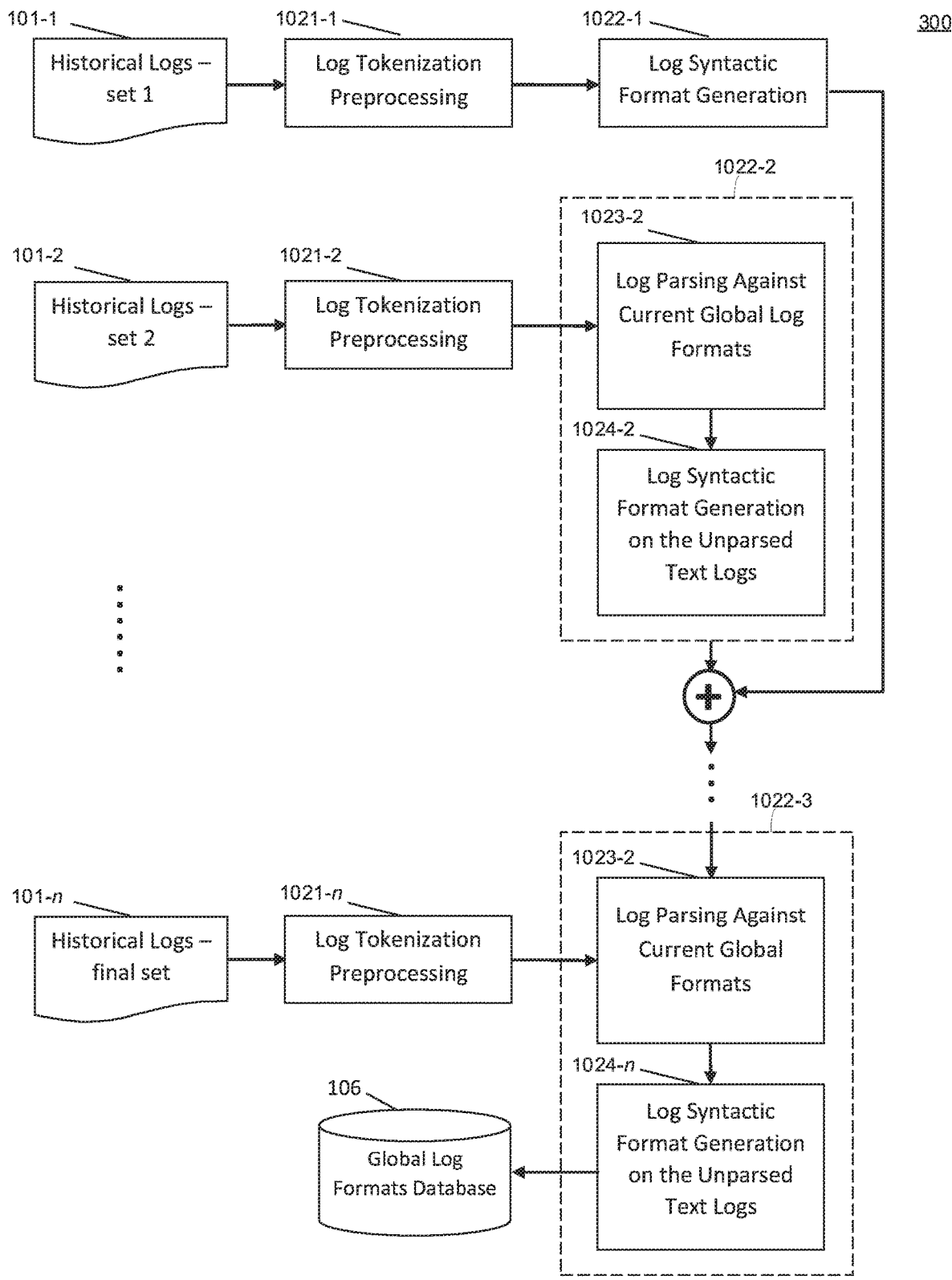
FIG. 3 is a block/flow diagram of an adaptive log format learning technique for global log format dictionary generation, in accordance with an embodiment of the present invention.

With reference to FIG. 3, a system/method 300 is provided illustrating the performance of adaptive log format learning for global log format dictionary generation. The system/method 300 can be performed by component 102 of FIG. 1.

The system/method 300 can include the multiple sets of historical logs 101 as described above with reference to FIG. 1. As shown, the multiple sets of historical logs 101 can include set 1 101-1, set 2 101-2, . . . , final set 101-*n*. The sets of historical logs 101-1 through 101-*n* can be applied to respective ones of components 1021-1 through 1021-*n* for log tokenization preprocessing.

Components 1021-1 through 1021-*n* can tokenize the logs of their respective sets of historical logs. The tokenization preprocessing can be performed by splitting the historical logs with a set of predefined or user-supplied delimiters. Such a technique can be applicable in both single-byte and multi-byte character encodings, which can allow for applications to many different language settings used in different countries. Various types of time stamp formats can also be recognized, matched and standardized. Components 1021-1 through 1021-*n* can provide an interface for a user to manually input rules for receiving rules as input from the user and tokenize the historical logs if any strings are matched against the rules. Furthermore, components 1021-1 through 1021-*n* can include an interface for the user to provide a specific log format structure such as, e.g., CSV (Comma Separated Values) files. Since tokens are the smallest units of the operational logs, which are the building element of a composite log, the tokenization process performed by components 1021-1 through 1021-*n* can bring semi-structure information into the unstructured logs.

The output of component 1021-1 can be applied to component 1022-1 to obtain an initial log syntactic format set using log syntactic format generation. Log syntactic formats (e.g., regular expressions) can be used as generation schema for producing logs and can capture the structural information of the logs (e.g., heterogeneous logs). In one embodiment, component 1022-1 can employ a clustering process that aggregates multiple logs with similar structural information into clusters. For example, the clustering process can include an automated unsupervised clustering process. A similarity measure can be defined as a token category similarity. Once the logs are clustered, component 1022-1 can merge the clusters to produce a final format (e.g., final regular expression format) as the log syntactic format. Each merge step can leverage a process to align log formats (e.g., leverage the Smith-Waterman algorithm). Illustratively, a sequential merge process can be initially utilized. After several rounds of merge operations, when the sequential merge fails to produce adequate performance, an Unweighted Pair Group Method with Arithmetic Mean (UPGMA) process can be used. A cost function that determines a generality of the formats can be used to identify an end-of-pattern recognition procedure once the cost is within a certain pre-defined threshold.

Each token generated by component 1021-1 can be treated as a unit, and the log can be an ordered composition of all the tokens. Thus, if the token units switch order, component 1022-1 can produce different log syntactic formats.

As further shown, the outputs of components 1021-2 through 1021-*n* can be fed into respective ones of components 1022-2 through 1022-*n* for log syntactic format generation. More specifically, in this illustrative example, the outputs of components 1021-2 through 1021-*n* can be applied to respective ones of components 1023-1 through 1023-*n* for log parsing against current global log formats by analyzing the new set of tokenized logs. For example, the new set of tokenized logs can be analyzed through regular expression matching, where the log format is represented by regular expression. Given the list of existing log formats, components 1023-2 through 1023-*n* can match the new set of tokenized logs against a list of regular expressions. An input log can either be matched to any of the existing log formats (e.g., regular expressions), or not match the input log at all. Illustratively, Logstash, which is an open source general log parsing engine, can be used to parse new sets of tokenized logs given the existing log format models.

Those logs that are unmatched can be provided as input to respective ones of components 1024-1 through 1024-*n* for log syntactic format generation on unparsed text logs. Accordingly, only those logs which are not matched to any of the existing log formats by components 1023-2 through 1023-*n* can be the output to respective ones of components 1024-1 through 1024-*n* for learning new log formats.

The functionality of components 1024-2 through 1024-*n* is similar to that of component 1022-1. For example, components 1024-2 through 1024-*n* can each apply a clustering process (e.g., an automated unsupervised clustering process) to produce log formats which do not exist in the aggregation of all previous log formats. The outputs of components 1024-2 through 1024—can include new log formats which can be aggregated together with the previous output into a new updated log format. Therefore, the adaptive and additive learning approach can produce a global log format dictionary which can represent the different log syntactic formats within all of the multiple sets of historical logs 101-1 through 101-*n*. Accordingly, current log formats can be aggregated with the previous log formats to produce a final set of global log formats dictionary for storage in a global log formats or global model database 106. Database 106 will be described in further detail below with reference to FIG. 1.

Referring back to FIG. 1, the learning stage 10 can further include a component 103 for log semantic content extraction and database 106, as mentioned above with reference to FIG. 3. For example, an output of component 102 can be provided to component 103 and database 106, and component 103 can extract log semantic content of each log format based on component 102 and database 106. As described above with reference to FIG. 2, the log formats 220 can include variable fields which can take different values in different log messages. Further details regarding the operation of component 103 will now be described below with reference to FIG. 4.

Figure 4:
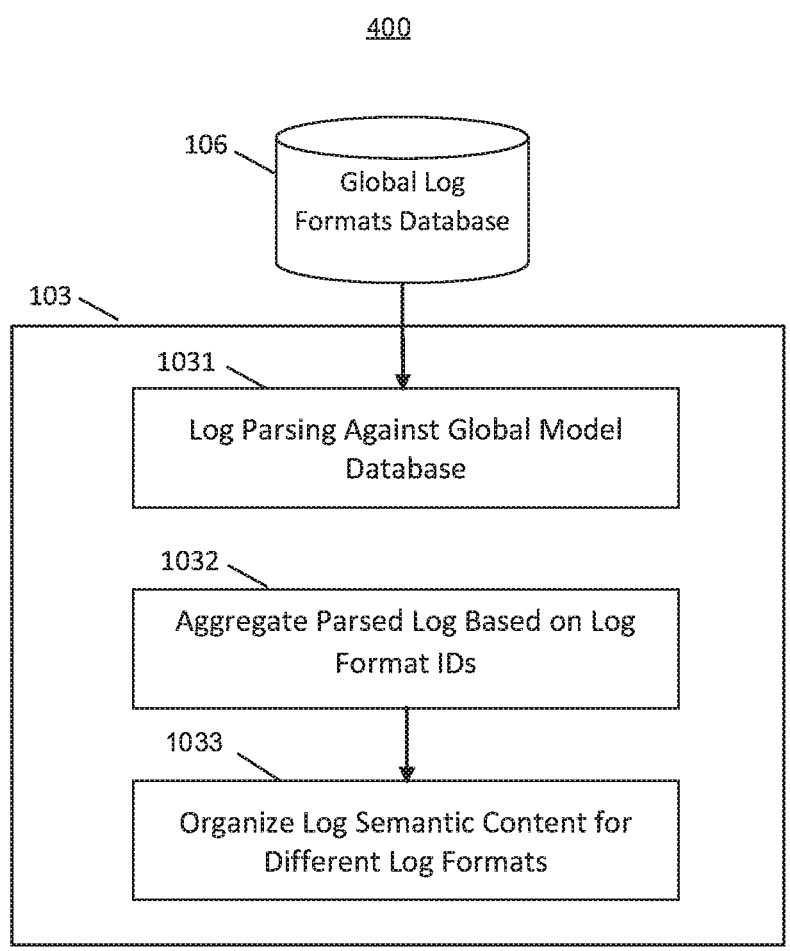
FIG. 4 is a block/flow diagram of log semantic content extraction, in accordance with an embodiment of the present invention.

With reference to FIG. 4, a system/method 400 is provided illustrating the performance of log semantic content extraction. The system/method 400 can include database 106 and component 103, as described above with reference to FIG. 1.

As shown, component 103 can include a component 1031 for performing log parsing against database 106. The functionality of component 1031 is similar to that of component 1024 described above with reference to FIG. 3, except that each of the multiple sets of historical logs can be parsed against database 106. The parsed results for each log message can include a global log format ID and content for each variable field.

Component 103 can further include a component 1032 for parsed log aggregation based on log format identifiers (IDs).

For example, component 1032 can perform aggregation for the parsed and extracted variable field contents for each log format ID per each set of historical logs. More specifically, component 1032 can scan through all log messages within each set and can aggregate the log format IDs and corresponding contents for different variable fields.

Component 103 can further include a component 1033 for organizing log semantic content for different log formats after the aggregated log semantic content is ready. For example, an associated map data structure can be used to map each log format ID to its variable fields. Each variable field can map to its own content with distinct values and frequencies. Variable fields that include fields corresponding to numbers, words, mixture of numbers and words, and IP addresses can be extracted and organized, since such variable fields represents the semantic information of the log messages.

Referring back to FIG. 1, the learning stage 10 can further include a component 104 for joint semantic and syntactic feature representation. Based on dictionary 106, component 104 can generate features with joint semantic and syntactic representations after log syntactic information obtained from component 102 and log semantic content extracted in component 103 are ready. Further details regarding the operation of component 104 will now be described below with reference to FIG. 5.

Figure 5:
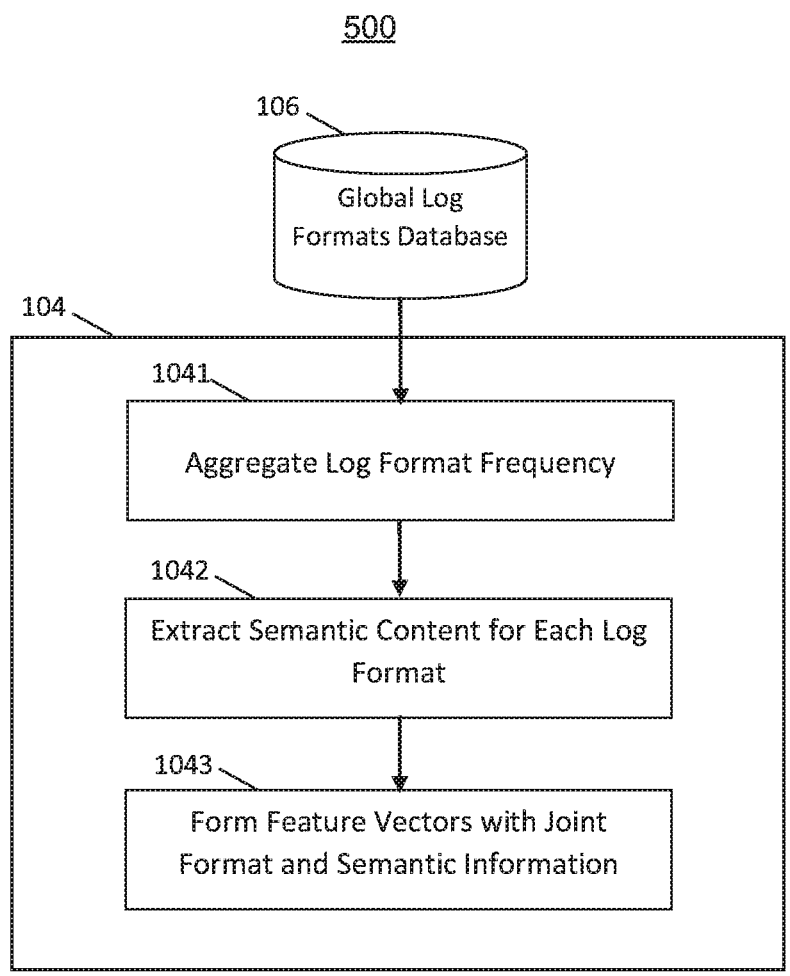
FIG. 5 is a block/flow diagram of joint semantic and syntactic feature representation, in accordance with an embodiment of the present invention.

With reference to FIG. 5, a system/method 500 is provided illustrating the performance of joint semantic and syntactic feature representation. The system/method 500 can include database 106 and component 104, as described above with reference to FIG. 1.

In text document similarity technology, one similarity measures that can be used is term-frequency-inverse-document-frequency (TF-IDF). The reason TF-IDF can be used is because there are many stop words or uninteresting and unimportant words in natural language processing, and text document retrieval using an inverse document frequency feature can reduce weights on those stop words. On the other hand, because there can be many distinct words or terms in the natural language, the inverse document frequency weights can also effectively reduce the overall dimensionality of feature vectors. In log retrieval system, each of the log formats is important because each of them is an output of system status and execution records. Meanwhile, there are only a limited number of distinct log formats in the global log format ID dictionary.

Therefore, as shown, component 104 can include a component 1041 for log format frequency aggregation. Component 104 can use term frequency to characterize the log syntactic information in the joint feature vector to represent each set of historical logs. An associated map data structure can be used to record each individual log format with its frequency within every set of historical logs. The output of component 103 may have already organized the log semantic content for each log format ID based on the associated map data structure.

Component 104 can further include a component 1042 for extracting semantic content for each log format. Component 1042 can traverse through the log format IDs for each set of historical logs. For any given log format ID, component 1042 can locate the semantic content from the output of component 103 and can combine the semantic content with the log format frequency information.

Component 104 can further include a component 1043 to form feature vectors representing the multiple sets of historical logs with joint format and semantic representations. Once both log format term frequency and its corresponding content values and frequency are available, component 1043 can form a feature vector for each of the multiple sets of historical logs. Each feature vector formed by component 1043 can include all distinct log formats and their frequencies present in a set of historical logs and content values and frequencies for all of the variable fields. The dimension of the feature vector can be highly dependent on the underlying log generating system. Each feature vector can be a representation and signature of any set of historical logs.

Referring back to FIG. 1, the learning stage 10 can further include a log signature database 105. Database 105 can store and index the log signature feature vectors for the historical logs. In one embodiment, database 105 can include a NoSQL database as the storage mechanism. Each item or entry in database 105 can be a key-value pair, where the key is the index of historical log sets and the value is the corresponding joint syntactic and semantic feature vector. As will be described in further detail herein, database 105 can be used later on during query stage to retrieve the feature vectors for similarity computation.

As mentioned previously, the output of component 102 can be stored in database 106, which is the database for organizing global log formats. If each log format is a regular expression, database 106 can include the same or similar database as the one in database 105 (e.g., NoSQL database). For example, each item or entry in database 106 can be a key-value pair, where the key is the log format global ID and the value is the regular expression strings. Database 106 functions as an intermediary between the learning and retrieval stages 10 and 20. Moreover, all necessary models after learning stages can be stored in database 106.

The retrieval stage 20 can include a plurality of components that can receive a set of query logs 201 as input and retrieve a most similar set of historical logs based on the set of query logs 201. The set of query logs 201 can be associated with a current system failure. As will be described in further detail below, the components of the retrieval stage 20 can use outputs from the learning stage 10 stored in databases 105 and 106 to perform the retrieval.

The set of query logs 201 can be of the same or similar format as the multiple sets of historical logs 101. However, the set of query logs 201 can be obtained from a different system instance than the one in the learning stage 10. For example, two copies of same software applications can execute in different sites with overlapping semantic information. The purpose of the retrieval is to find out any similarity between two execution instances. The set of query logs can be transported into the retrieval stage 20 in the same or similar manner as in the multiple sets of historical logs 101 in learning stage 10.

The set of query logs 201 can be provided to a component 202 for query log parsing against a model database. For example, component 202 can parse each query log of the set of query logs 201 against database 106, which, as mentioned above, stores the global log formats or models generated from the learning stage 10. Further details regarding the operation of component 202 will now be described below with reference to FIG. 6.

Figure 6:
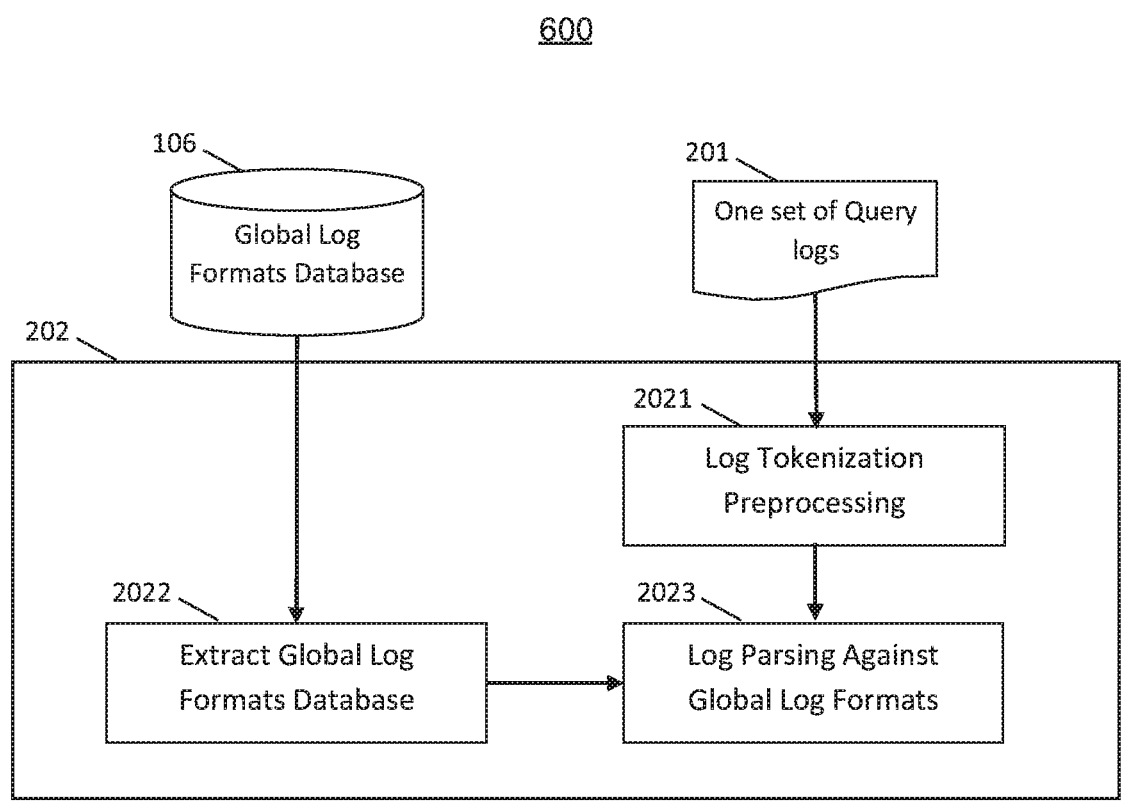
FIG. 6 is a block/flow diagram of query log parsing, in accordance with an embodiment of the present invention.

With reference to FIG. 6, a system/method 600 is provided illustrating the performance of query log parsing. The system/method 600 can include database 106 and component 202, as described above with reference to FIG. 1.

A shown, component 202 can include a log tokenization preprocessing component 2021. A set of query logs 201, as described above with reference to FIG. 1, can be provided to component 2021 for log tokenization preprocessing. The functionality of component 2021 can be the same or similar to that of component 1021 described above with reference to FIG. 3.

Component 202 can further include a component 2022 for global log formats database extraction. As shown, component 2022 can query database 106 to extract the global log formats database. If the global log formats database does not exist in database 106, then component 2022 can exit the workflow and return an error message to inform a user that global log formats database is not available, and can instruct the user to execute the learning stage 10 before continuing. If the global log formats database exists in database 106, component 2022 can extract log formats (e.g., regular expressions) with IDs, and write the extracted data into a file for subsequent processing.

Component 202 can further include a component 2023 for log parsing against global log formats. The functionality of component 2023 can be the same or similar to that of component 1024 of FIG. 3. The parsed results for each query log can include the global log format ID and content for each variable field.

Referring back to FIG. 1, the retrieval stage 20 can further include a component 203 for log semantic content extraction. The functionality of component 203 can be the same or similar to that of component 103. The purpose of component 203 is to extract semantic content for each parsed query log.

The retrieval stage 20 can further include a component 204 for joint semantic and syntactic feature representation. The functionality of component 204 can be the same or similar to that of component 104. The purpose of component 204 is to form a feature vector for the query logs. The feature vector for the query logs can include both semantic and syntactic information. To compute the similarity distance between the query log feature vectors and the historical log feature vectors, as will be described in further detail below, component 204 can map the semantic and syntactic information of the query logs into the same feature space as the historical logs.

The retrieval stage 20 can further include a component 205 for similarity distance computation and ranking. Component 205 can calculate the similarity distance between the query log feature vectors and the historical log feature vectors. Based on the distance values, component 205 can sort and rank the historical logs. Further details regarding the operation of component 205 will now be described below with reference to FIG. 7.

Figure 7:
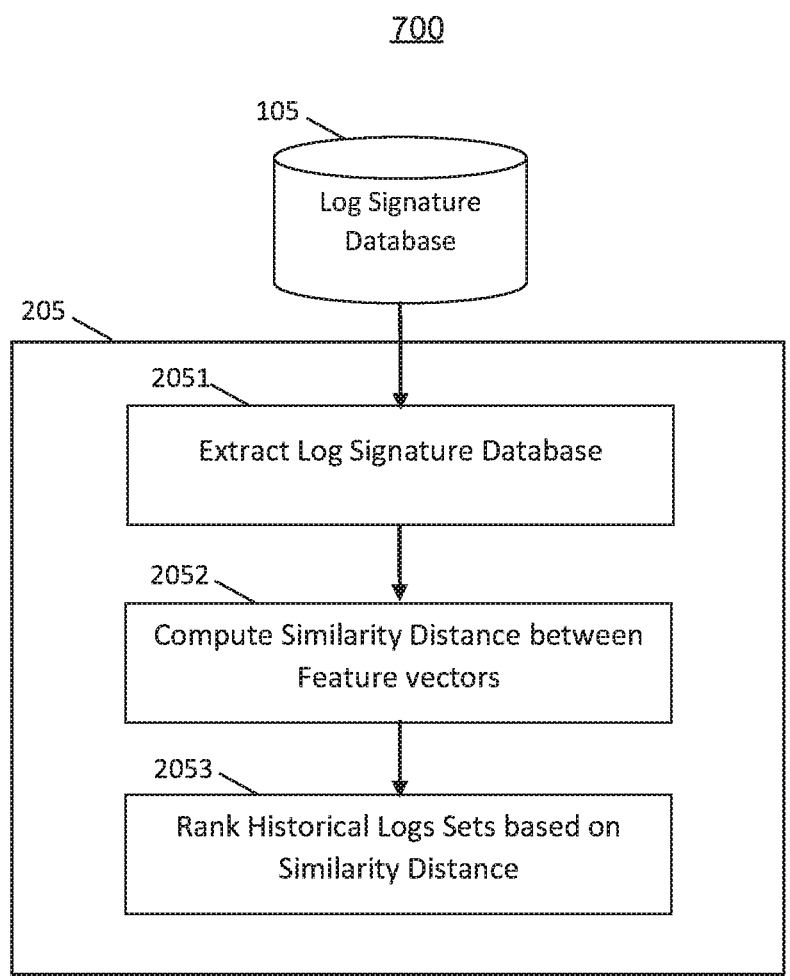
FIG. 7 is a block/flow diagram of similarity distance computation and ranking, in accordance with an embodiment of the present invention.

With reference to FIG. 7, a system/method 700 is provided illustrating the performance of similarity distance computation and ranking.

A shown, component 205 can include a component 2051 for log signature database extraction. For example, component 2051 can query the log signature database stored in database 105, as described in further detail with reference to FIG. 1. If the log signature table does not exist in database 105, component 2051 can exit the workflow and return an error message to inform a user that database 105 is not available, and can instruct the user to execute the learning stage 10 before continuing. If the global log format table exists in database 105, component 2051 can extract log formats (e.g., regular expressions) with IDs, and write the extracted data into a file for subsequent processing.

Component 205 can further include a component 2052 to compute similarity distances between feature vectors. For example, component 2052 can calculate the similarity distances between query log feature vectors and historical log feature vectors. Since a feature vector can be represented by term frequencies, cosine distance can be used to measure feature vector similarity. For example, given two feature vectors of attributes A and B, the cosine similarity $\cos(\theta)$ can be represented as:

$$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

where each $A_i$ and $B_i$ is a term frequency of either particular log format, or its variable field contents. Since term frequencies are positive numbers, the value of $\cos(\theta)$ ranges between 0 and 1 with 0 being least similar and 1 being identical. Component 2052 can compute the similarity for each historical log set versus the query log feature vector.

Component 205 can further include a component 2053 for ranking historical logs sets based on similarity distance. Component 2053 can aggregate and organize the results from component 2052. To retrieve a set of most similar historical logs, component 2053 can rank entire historical log sets based on the similarity distances (e.g., cosine similarity distances) computed by component 2052. For example, the historical log set with the highest similarity distance can be ranked the highest.

Referring back to FIG. 1, the retrieval stage 20 can further include component 206 for merging the retrieved results. Component 206 can organize the ranked results of component 205, and can retrieve a most similar set of logs based on the ranked results. The architecture 100 has the flexibility of selecting an appropriate time resolution parameter as the range of retrieved logs. For example, a user can set the time resolution parameter based upon the domain knowledge regarding the underlying system, or let the architecture 100 automatically discover the best parameter. Further details regarding the operation of component 206 will now be described below with reference to FIG. 8.

Figure 8:
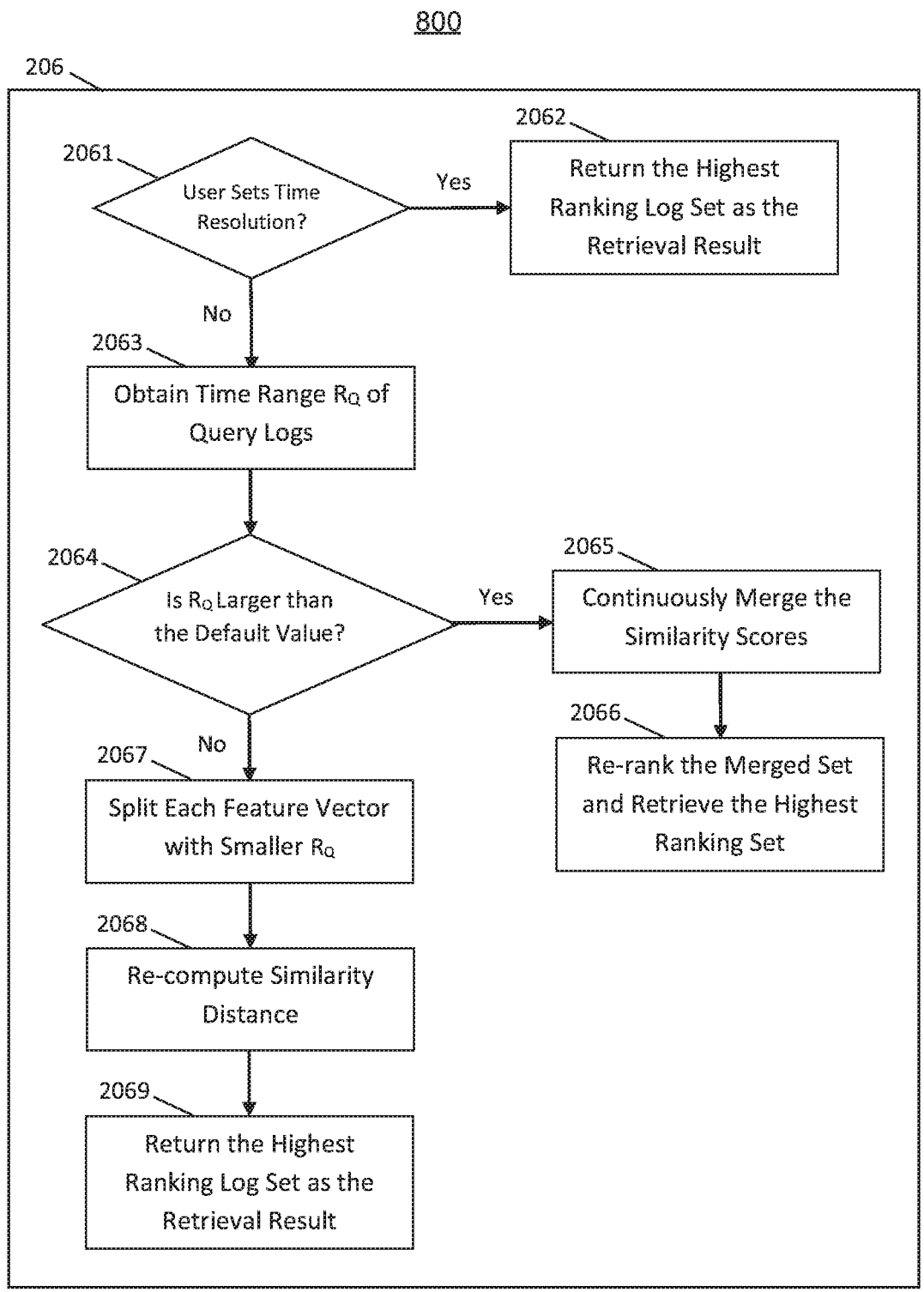
FIG. 8 is a block/flow diagram of merging retrieved results, in accordance with an embodiment of the present invention.

With reference to FIG. 8, a system/method 800 is provided illustrating the performance of merging retrieved results. The system/method 800 can include component 206, as described above with reference to FIG. 1.

As shown, component 206 can include a component 2061 for user time resolution set determination. Component 2061 can determine whether a user has already set the time resolution parameter in a configuration file as the range of the retrieved historical logs. This can be tested against the configuration file.

If component 2061 determines that the user has already set a time resolution parameter in the configuration file, then the outputs from component 205, described above with reference to FIGS. 1 and 7, are the right results with user set time range. Result retrieval component 2062 can return the highest ranking historical log set as the retrieval result.

If component 2061 determines that the user has not set a time resolution parameter, component 2063 can obtain a time range, $R_Q$, of the query logs. The time range $R_Q$ can be obtained by extracting time stamps of all query log messages, and computing a largest time range as $R_Q$. Component 206 can further include a component 2064 for time range size determination. Component 2064 can determine whether the time range $R_Q$ is larger than a default value used in the learning stage 10 described above with reference to FIG. 1.

If the time range $R_Q$ exceeds the default value, then the results from component 205 are based on a lower time range. In this case, component 2065 can merge the similarity scores from adjacent historical log sets (e.g., continuously) until the combined time ranges exceeds $R_Q$ to create a merged set. For example, the combined similarity scores can be averaged over the number of segments included in the final set so that the final similarity score is between 0 and 1, inclusive. Result retrieval component 2066 can retrieve a higher ranking historical log set after re-ranking the merged.

If the time range does not exceed the default value, a component 2067 can perform feature vector splitting to split each of the feature vectors from component 204, described above with reference to FIG. 1, into multiple feature vectors so that each one will cover a time range no larger than $R_Q$.

Component 2068 can re-compute the similarity distance (e.g., cosine similarity distance) between the query log feature vector and the split historical logs feature vectors, and component 2069 can rank the split historical log sets with the updated similarity distance, and can return the highest ranking historical log set based on the ranking. The retrieved split historical log set is the most similar to the query log with the same or similar time range.

Referring back to FIG. 1, the retrieval stage 20 can further include component 207 for performing system fault comparison. Component 207 can analyze the retrieved set of historical logs from the multiple sets of historical logs 101 against the set of query logs 201 by comparing the log formats and/or other statistical information. When mitigation solutions are available, system administrators can apply a same or similar solution for a current system failure associated with the set of query logs 201 without going through a lengthy process to find a solution. Accordingly, component 207 can improve system turnaround time to generate better service by, e.g., reducing system down time. Further details regarding the operation of component 207 will now be described below with reference to FIG. 9.

Figure 9:
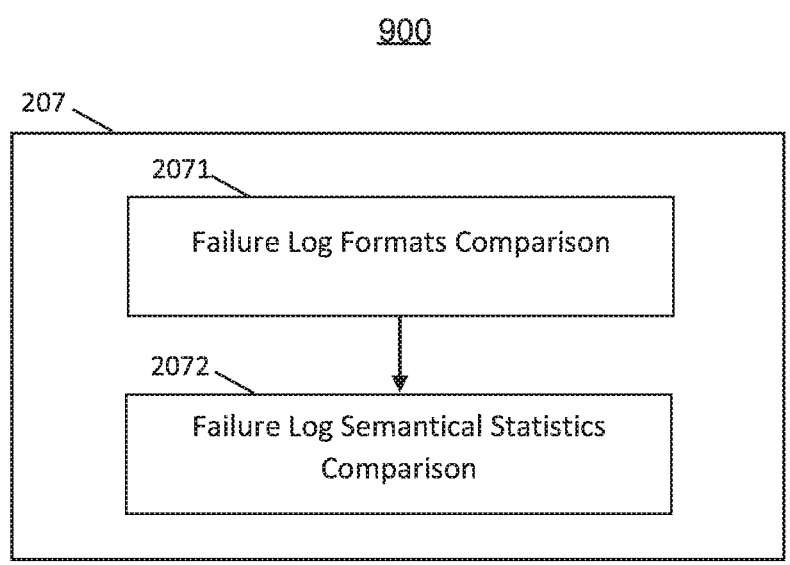
FIG. 9 is a block/flow diagram of system fault comparison, in accordance with an embodiment of the present invention.

With reference to FIG. 9, a system/method 900 is provided illustrating the performance of system fault comparison. The system/method 900 can include component 207, as described above with reference to FIG. 1.

As shown, component 207 can include a component 2071 for failure log formats comparison. Component 2071 can compare failure logs from both the set of query logs and the retrieved set of historical logs to find the similarity and differences in terms of log formats. The comparison can be based on a log formats set computation to find common and complement log formats. Since log formats provide information regarding system failure, the analysis performed by component 2071 can provide useful information regarding a current system failure such as whether the current system failure includes new information (e.g., new log formats).

As further shown, component 207 can further includes a component 2072 for failure log semantical statistical comparison. Component 2072 can analyze the comparison made by component 2071 based on log semantic and statistical information. For example, the analysis can be based on mean and variance for each log format semantic field variables. This analysis can provide further information regarding the system failure, including insights regarding the subtle difference between the current system failure associated with the set of query logs and historical system failure associated with the retrieved set of historical logs.

Figure 10:
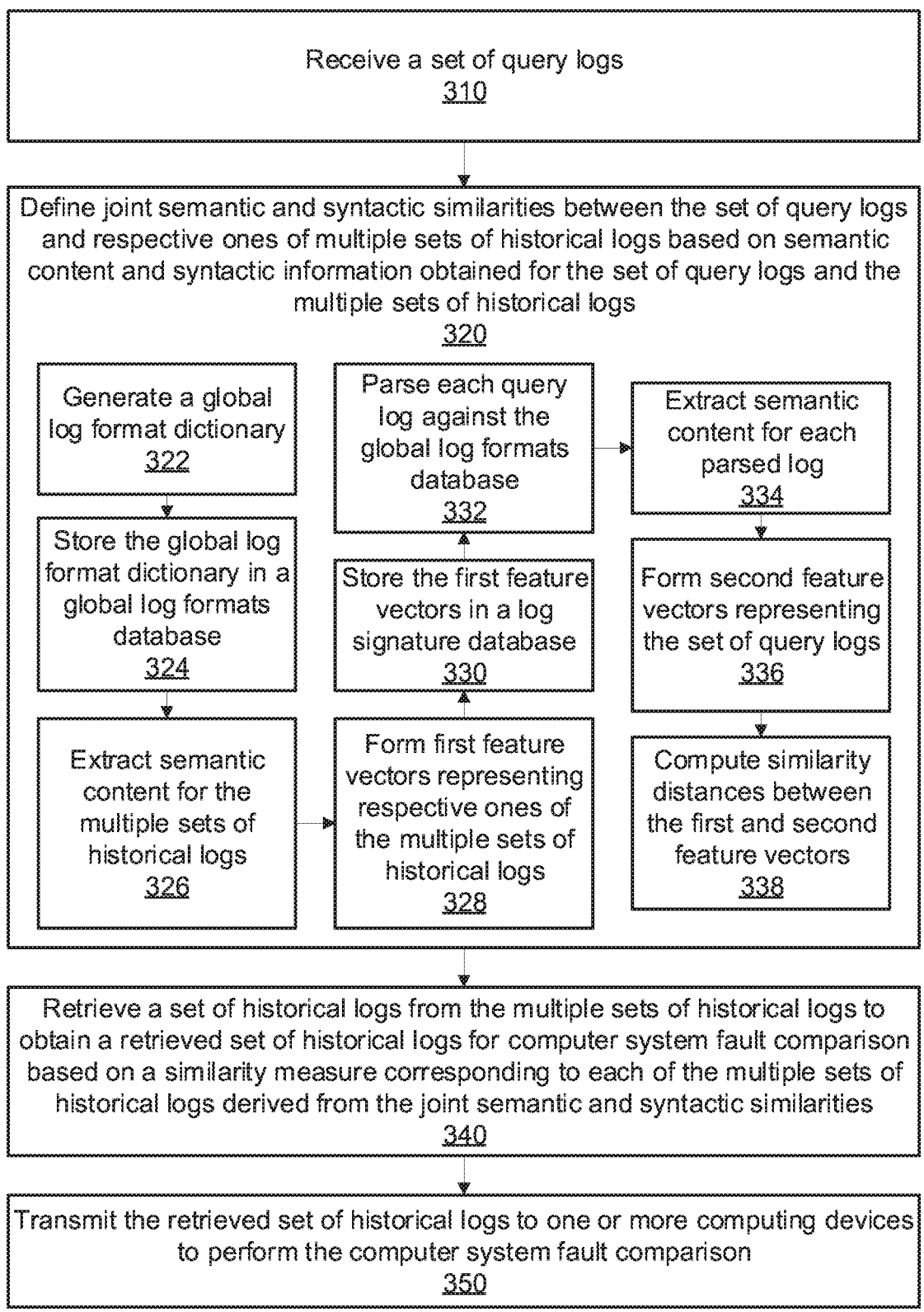
FIG. 10 is a block/flow diagram of a system/method for implementing an unsupervised cross-domain distance metric adaptation framework with a feature transfer network, in accordance with an embodiment of the present invention.

With reference to FIG. 10, a block/flow diagram is provided illustrating a system/method 1000 for log retrieval based on joint semantic and format similarity.

At block 310, a set of query logs are received. The set of query logs can be associated with a current system failure. The set of query logs can be received from one or more users associated with one or more computing devices. For example, the one or more users can include one or more system administrators.

At block 320, joint semantic and syntactic similarities between the set of query logs and respective ones of multiple sets of historical logs are defined based on semantic content and syntactic information obtained for the set of query logs and the multiple sets of historical logs. The multiple sets of historical logs are associated with historical system computer system fault diagnoses (e.g., historical computer system failures).

An illustrative implementation of block 320 will now be described with reference to blocks 322-338.

At block 322, a global log format dictionary is generated.

At block 324, the global log format dictionary is stored in a global log formats database.

At block 326, semantic content for the multiple sets of historical logs is be extracted. In one embodiment, extracting the semantic content for the multiple sets of historical logs can include performing log parsing against the global log formats database to obtain parsed logs, aggregating the parsed logs based on log format identifiers, and organizing log semantic content for different log formats based on the aggregation.

At block 328, first feature vectors representing respective ones of the multiple sets of historical logs are formed. The first feature vectors can represent respective ones of the multiple sets of historical logs with joint semantic and syntactic representations based on the obtained semantic content and syntactic information.

At block 330, the first feature vectors can be stored in a log signature database.

At block 332, each query log can be parsed against the global log formats database.

At block 334, semantic content for each parsed query log can be extracted.

At block 336, second feature vectors representing the set of query logs are formed. The second feature vectors can represent the set of query logs with joint semantic and syntactic representations based on the semantic content and syntactic information for the set of query logs.

At block 338, similarity distances between the first and second feature vectors are computed. The similarity distances be used to generate similarity measures for the multiple sets of historical logs. The similarity measures can be used for retrieving a set of historical logs from the multiple sets of historical logs, as will now be described in further detail with reference to block 340.

After the joint semantic and syntactic similarities are defined at block 320, at block 340, a set of historical logs from the multiple sets of historical logs is retrieved to obtain a retrieved set of historical logs for computer system fault comparison based on a similarity measure corresponding to each of the multiple sets of historical logs derived from the joint semantic and syntactic similarities. Retrieving the set of historical logs can include ranking the multiple sets of historical logs based on the similarity measures, and identifying the set of historical logs for retrieval based on the ranking. In one embodiment, retrieving the set of historical logs can further include merging the similarity measures based on a time resolution parameter or a time range.

At block 350, the retrieved set of historical logs can be transmitted to one or more computing devices to perform the computer system fault comparison. For example, the one or more computing devices can correspond to the one or more users (e.g., one or more system administrators) who provided the set of query logs as input for retrieving the set of historical logs.

Performing the computer system fault comparison can include analyzing the retrieved set of historical logs against the set of query logs by comparing the log formats and/or other statistical information. When mitigation solutions are available, the one or more users can apply a same or similar solution for a current system failure associated with the set of query logs without going through a lengthy process to find a solution. Accordingly, the computer system fault comparison can improve computer system turnaround time to generate better service by, e.g., reducing system down time.

Further details regarding blocks 310-350 are described above with reference to FIGS. 1-9.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
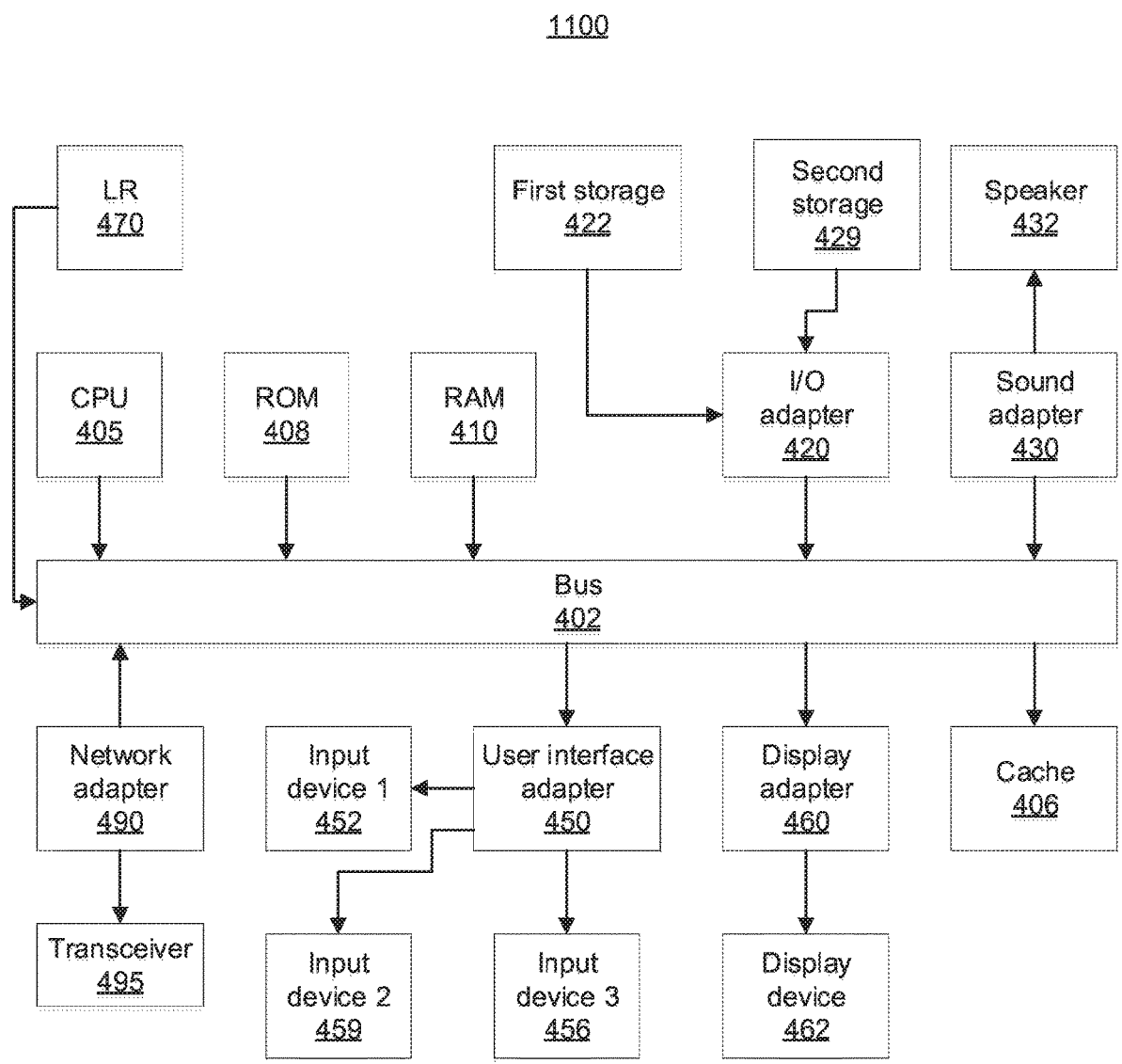
FIG. 11 is a block/flow diagram illustrating a computer system, in accordance with the present principles.

Referring now to FIG. 11, an exemplary computer system 1100 is shown which may represent a server or a network device, in accordance with an embodiment of the present invention. The computer system 400 includes at least one processor (CPU) 405 operatively coupled to other components via a system bus 402. A cache 406, a Read Only Memory (ROM) 408, a Random-Access Memory (RAM) 410, an input/output (I/O) adapter 420, a sound adapter 430, a network adapter 490, a user interface adapter 450, and a display adapter 460, are operatively coupled to the system bus 402.

A first storage device 422 and a second storage device 429 are operatively coupled to system bus 402 by the I/O adapter 420. The storage devices 422 and 429 can be any of a disk storage device (e.g., a magnetic or optical disk storage device), a solid state magnetic device, and so forth. The storage devices 422 and 429 can be the same type of storage device or different types of storage devices.

A speaker 432 may be operatively coupled to system bus 402 by the sound adapter 430. A transceiver 495 is operatively coupled to system bus 402 by network adapter 490. A display device 462 is operatively coupled to system bus 402 by display adapter 460.

A first user input device 452, a second user input device 459, and a third user input device 456 are operatively coupled to system bus 402 by user interface adapter 450. The user input devices 452, 459, and 456 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 452, 459, and 456 can be the same type of user input device or different types of user input devices. The user input devices 452, 459, and 456 are used to input and output information to and from system 400.

Log retrieval (LR) component 470 may be operatively coupled to system bus 402. LR component 470 is configured to perform one or more of the operations described above. LR component 470 can be implemented as a standalone special purpose hardware device, or may be implemented as software stored on a storage device. In the embodiment in which LR component 470 is software-implemented, although shown as a separate component of the computer system 400, LR component 470 can be stored on, e.g., the first storage device 422 and/or the second storage device 429. Alternatively, LR component 470 can be stored on a separate storage device (not shown).

Of course, the computer system 400 may also include other elements (not shown), as readily contemplated by one of skill in the art, as well as omit certain elements. For example, various other input devices and/or output devices can be included in computer system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 400 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for diagnosing computer system faults using log retrieval based on joint semantic and syntactic similarities, comprising:
   receiving a set of query logs;
   defining joint semantic and syntactic similarities between the set of query logs and respective ones of multiple sets of historical logs based on semantic content and syntactic information obtained for the set of query logs and the multiple sets of historical logs, the multiple sets of historical logs being associated with historical computer system fault diagnoses;
   retrieving a set of historical logs from the multiple sets of historical logs to obtain a retrieved set of historical logs for computer system fault comparison based on a similarity measure corresponding to each of the multiple sets of historical logs derived from the joint semantic and syntactic similarities; and
   transmitting the retrieved set of historical logs to one or more computing devices to perform the computer system fault comparison.

2. The method of claim 1, further comprising:
   generating a global log format dictionary by performing adaptive log format learning to generate log syntactic formats;
   storing the global log format dictionary in a global log formats database; and
   extracting the semantic content for the multiple sets of historical logs based on the global log formats dictionary.

3. The method of claim 2, wherein extracting the semantic content for the multiple sets of historical logs further includes:
   performing log parsing against the global log formats database to obtain parsed logs;
   aggregating the parsed logs based on log format identifiers; and
   organizing log semantic content for different log formats based on the aggregation.

4. The method of claim 2, further comprising forming first feature vectors representing respective ones of the multiple sets of historical logs with joint semantic and syntactic representations based on the obtained semantic content and syntactic information, and storing the first feature vectors in a log signature database.

5. The method of claim 4, further comprising:
   parsing each query log of the set of query logs against the global log formats database;
   extracting semantic content for each parsed query log; and
   forming second feature vectors representing the set of query logs with joint semantic and syntactic representations based on the semantic content and syntactic information for the set of query logs.

6. The method of claim 5, further comprising computing similarity distances between the first and second feature vectors to generate the similarity measures for the multiple sets of historical logs.

7. The method of claim 1, wherein retrieving the set of historical logs further includes ranking the multiple sets of historical logs based on the similarity measures, and identifying the set of historical logs for retrieval based on the ranking.

8. The method of claim 7, wherein retrieving the set of historical logs further includes merging the similarity measures based on a time resolution parameter or a time range.

9. A computer program product comprising a non-transitory computer readable storage medium having program instructions embodied therewith, the program instructions executable by a computer to cause the computer to perform a method for diagnosing computer system faults using log retrieval based on joint semantic and syntactic similarities, the method performed by the computer comprising:
   receiving a set of query logs;
   defining joint semantic and syntactic similarities between the set of query logs and respective ones of multiple sets of historical logs based on semantic content and syntactic information obtained for the set of query logs and the multiple sets of historical logs, the multiple sets of historical logs being associated with historical computer system fault diagnoses;
   retrieving a set of historical logs from the multiple sets of historical logs to obtain a retrieved set of historical logs for computer system fault comparison based on a similarity measure corresponding to each of the multiple sets of historical logs derived from the joint semantic and syntactic similarities; and
   transmitting the retrieved set of historical logs to one or more computing devices to perform the computer system fault comparison.

10. The computer program product of claim 9, wherein the method further includes:
    generating a global log format dictionary by performing adaptive log format learning to generate log syntactic formats;
    storing the global log format dictionary in a global log formats database; and
    extracting the semantic content for the multiple sets of historical logs based on the global log formats dictionary.

11. The computer program product of claim 10, wherein extracting the semantic content for the multiple sets of historical logs further includes:
    performing log parsing against the global log formats database to obtain parsed logs;
    aggregating the parsed logs based on log format identifiers; and
    organizing log semantic content for different log formats based on the aggregation.

12. The computer program product of claim 10, wherein the method further includes forming first feature vectors representing respective ones of the multiple sets of historical logs with joint semantic and syntactic representations based on the obtained semantic content and syntactic information, and storing the first feature vectors in a log signature database.

13. The computer program product of claim 12, wherein the method further includes:
    parsing each query log of the set of query logs against the global log formats database;
    extracting semantic content for each parsed query log; and forming second feature vectors representing the set of query logs with joint semantic and syntactic representations based on the semantic content and syntactic information for the set of query logs.

14. The computer program product of claim 13, further comprising computing similarity distances between the first and second feature vectors to generate the similarity measures for the multiple sets of historical logs.

15. The computer program product of claim 9, wherein retrieving the set of historical logs further includes ranking the multiple sets of historical logs based on the similarity measures, and identifying the set of historical logs for retrieval based on the ranking.

16. The computer program product of claim 15, wherein retrieving the set of historical logs further includes merging the similarity measures based on a time resolution parameter or a time range.

17. A system for diagnosing computer system faults using log retrieval based on joint semantic and syntactic similarities, comprising:
- a memory device for storing program code; and
- at least one processor device operatively coupled to a memory device and configured to execute program code stored on the memory device to:
  - receive a set of query logs;
  - define joint semantic and syntactic similarities between the set of query logs and respective ones of multiple sets of historical logs based on semantic content and syntactic information obtained for the set of query logs and the multiple sets of historical logs, the multiple sets of historical logs being associated with historical computer system fault diagnoses;
  - retrieve a set of historical logs from the multiple sets of historical logs to obtain a retrieved set of historical logs for computer system fault comparison based on a similarity measure corresponding to each of the multiple sets of historical logs derived from the joint semantic and syntactic similarities; and
  - transmit the retrieved set of historical logs to one or more computing devices to perform the computer system fault comparison.

18. The system of claim 17, wherein the at least one processor device is further configured to execute program code stored on the memory device to:
- generate a global log format dictionary by performing adaptive log format learning to generate log syntactic formats;
- store the global log format dictionary in a global log formats database; and
- extract the semantic content for the multiple sets of historical logs based on the global log formats dictionary, wherein the at least one processor device is further configured to extract the semantic content for the multiple sets of historical logs by:
  - performing log parsing against the global log formats database to obtain parsed logs;
  - aggregating the parsed logs based on log format identifiers; and
  - organizing log semantic content for different log formats based on the aggregation.

19. The system of claim 18, wherein the at least one processor device is further configured to execute program code stored on the memory device to:
- form first feature vectors representing respective ones of the multiple sets of historical logs with joint semantic and syntactic representations based on the obtained semantic content and syntactic information;
- store the first feature vectors in a log signature database;
- parse each query log of the set of query logs against the global log formats database;
- extract semantic content for each parsed query log;
- form second feature vectors representing the set of query logs with joint semantic and syntactic representations based on the semantic content and syntactic information for the set of query logs; and
- compute similarity distances between the first and second feature vectors to generate the similarity measures for the multiple sets of historical logs.

20. The system of claim 17, wherein the at least one processor device is further configured to retrieve the set of historical logs by ranking the multiple sets of historical logs based on the similarity measures, and identifying the set of historical logs for retrieval based on the ranking.

\* \* \* \* \*